(12) United States Patent
Wu et al.

(10) Patent No.: US 7,075,795 B2
(45) Date of Patent: *Jul. 11, 2006

(54) ELECTROMAGNETIC BUS COUPLING

(75) Inventors: Yinan Wu, Westborough, MA (US); Mark Naylor, Franklin, MA (US); John L. Critchlow, Northborough, MA (US); Karl Wyatt, Cary, IL (US); John R. Benham, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/077,593

(22) Filed: Feb. 14, 2002

(65) Prior Publication Data

US 2003/0150642 A1 Aug. 14, 2003

(51) Int. Cl.
*H05K 7/06* (2006.01)

(52) U.S. Cl. .................. 361/785; 361/788; 710/301; 439/950

(58) Field of Classification Search ........... 361/785, 361/787, 788, 790, 791; 375/257–259; 710/100, 710/106, 300–302, 305, 306, 312; 333/109, 333/112; 365/51, 52, 63, 197, 198; 439/950, 439/916
See application file for complete search history.

(56) References Cited

U.S. PATENT DOCUMENTS

| | | | |
|---|---|---|---|
| 3,516,065 A | * | 6/1970 | Murray et al. ............... 375/257 |
| 3,619,504 A | | 11/1971 | De Veer Olney et al. |
| 3,673,548 A | * | 6/1972 | Mattingly et al. ........... 439/637 |
| 5,192,832 A | | 3/1993 | Rudy, Jr. et al. |
| 5,363,071 A | | 11/1994 | Schwent et al. |
| 5,432,486 A | | 7/1995 | Wong |
| 5,638,402 A | | 6/1997 | Osaka et al. |
| 5,958,030 A | * | 9/1999 | Kwa ........................... 710/300 |
| 6,111,476 A | | 8/2000 | Williamson |
| 6,163,464 A | * | 12/2000 | Ishibashi et al. ............ 361/788 |
| 6,335,662 B1 | | 1/2002 | Del Rosario, Jr. et al. |
| 6,399,898 B1 | * | 6/2002 | Kwong et al. ............... 174/261 |
| 6,434,647 B1 | | 8/2002 | Bittner, Jr. |
| 6,438,012 B1 | | 8/2002 | Osaka et al. |
| 6,498,305 B1 | | 12/2002 | Marketkar et al. |
| 6,573,801 B1 | * | 6/2003 | Benham et al. ........... 333/24 R |
| 6,576,847 B1 | | 6/2003 | Marketkar et al. |
| 6,625,682 B1 | | 9/2003 | Simon et al. |
| 6,705,898 B1 | * | 3/2004 | Pechstein et al. ........... 439/660 |
| 6,882,239 B1 | | 4/2005 | Miller |
| 2001/0024888 A1 | | 9/2001 | Marketkar et al. |
| 2001/0053187 A1 | | 12/2001 | Simon et al. |
| 2002/0018526 A1 | * | 2/2002 | Osaka et al. ................ 375/257 |
| 2003/0152153 A1 | | 8/2003 | Simon et al. |
| 2003/0227346 A1 | | 12/2003 | Simon et al. |
| 2003/0227347 A1 | | 12/2003 | Simon et al. |
| 2003/0236005 A1 | | 12/2003 | Wu et al. |

FOREIGN PATENT DOCUMENTS

WO WO 00/72163 11/2000

* cited by examiner

*Primary Examiner*—John B. Vigushin
(74) *Attorney, Agent, or Firm*—Philip A. Pedigo (57) ABSTRACT

A connector is configured for insertion and removal of a digital device. The connector has contacts arranged to make electrical connection to conductors on the digital device while the digital device is inserted in the connector. A first electromagnetic coupler is connected to at least one of the contacts of the connector. The electromagnetic coupler is configured for electromagnetic coupling at an interface to a second electromagnetic coupler that is connected to a communication bus.

30 Claims, 7 Drawing Sheets

ELECTROMAGNETIC BUS COUPLING

BACKGROUND

This description relates to electromagnetic bus coupling.

Digital devices such as memory or input/output (I/O) devices are commonly connected to communication buses through sockets that are wired to the buses. A user can insert a device into a socket and remove it as needed.

Devices can also be coupled to buses electromagnetically as suggested in U.S. Pat. No. 5,638,402. That patent describes the use of connectors for an electromagnetically coupled bus that permit live insertion or withdrawal of device modules.

DESCRIPTION

Each of the following figures shows only examples of one or some implementations.

Figure 1:
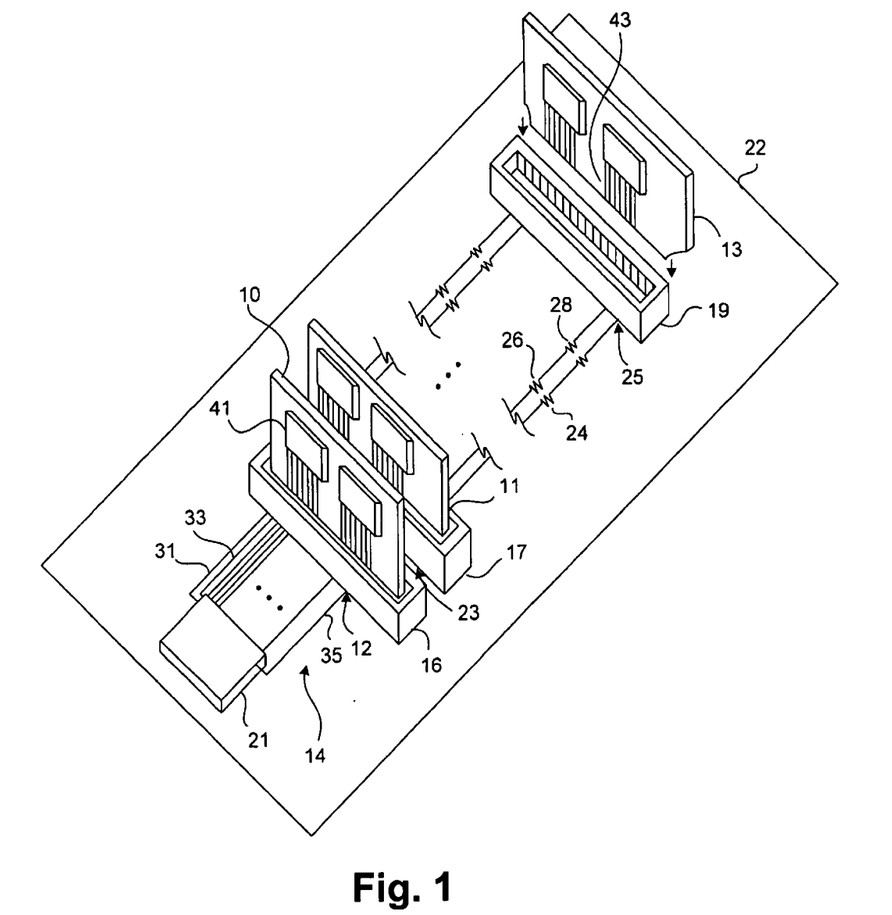
FIG. 1 is a three-dimensional view of a fragment of a motherboard and daughter cards mounted in sockets on the motherboard.
Figure 2:
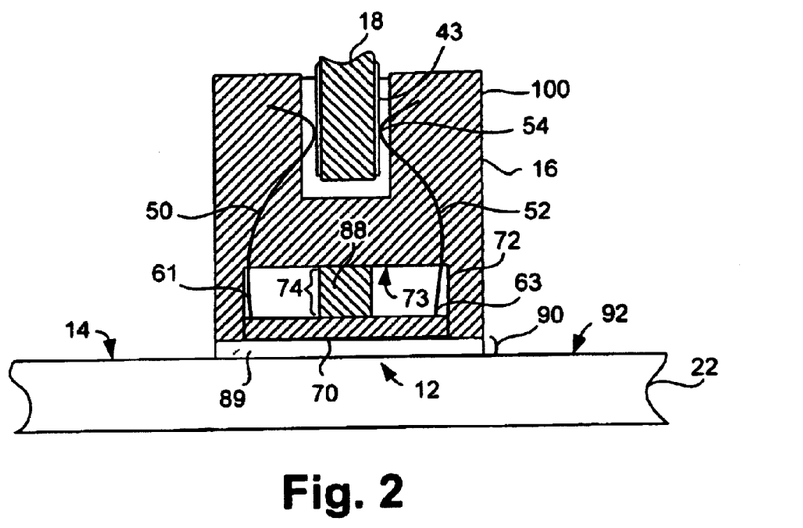
FIG. 2 is a sectional end view of a socket on a motherboard.

As shown in FIGS. 1 and 2, in some implementations a digital device 10, such as a memory card, may be electromagnetically coupled to a bus 14 using a socket 16 which permits insertion or removal of the digital device and provides the electromagnetic coupling between the bottom of the socket and the top of the bus across a coupling interface 12. Additional digital devices 11, 13 may be inserted into additional sockets 17, 19 that are also electromagnetically coupled to the bus 14 at other coupling interfaces 23, 25 located along the length of the bus. Signals carrying, for example, data, address, and control information may then be communicated between the digital devices and a processor 21 coupled to the bus 14. The invention is not limited to memory cards and is applicable to any kind of digital device that may need to communicate. Similarly, although we mention a processor as one example of a device with which the digital device is communicating, any sort of digital component may be communicating with the digital device.

The motherboard 22 on which the processor 21 and sockets 16, 17, and 19 are mounted may have multiple conductive layers separated by dielectric layers. The bus 14, e.g., a multi-drop parallel bus, may include signal, power, and ground conductors arranged on the conductive layers of the motherboard. The signal lines (e.g., 31, 33, 35) may run generally parallel along the length of the bus on the surface of the motherboard, and the ground and power may be carried on internal conductive layers of the motherboard. The reference planes on the motherboard may provide impedance control for the signal lines.

Figure 8:
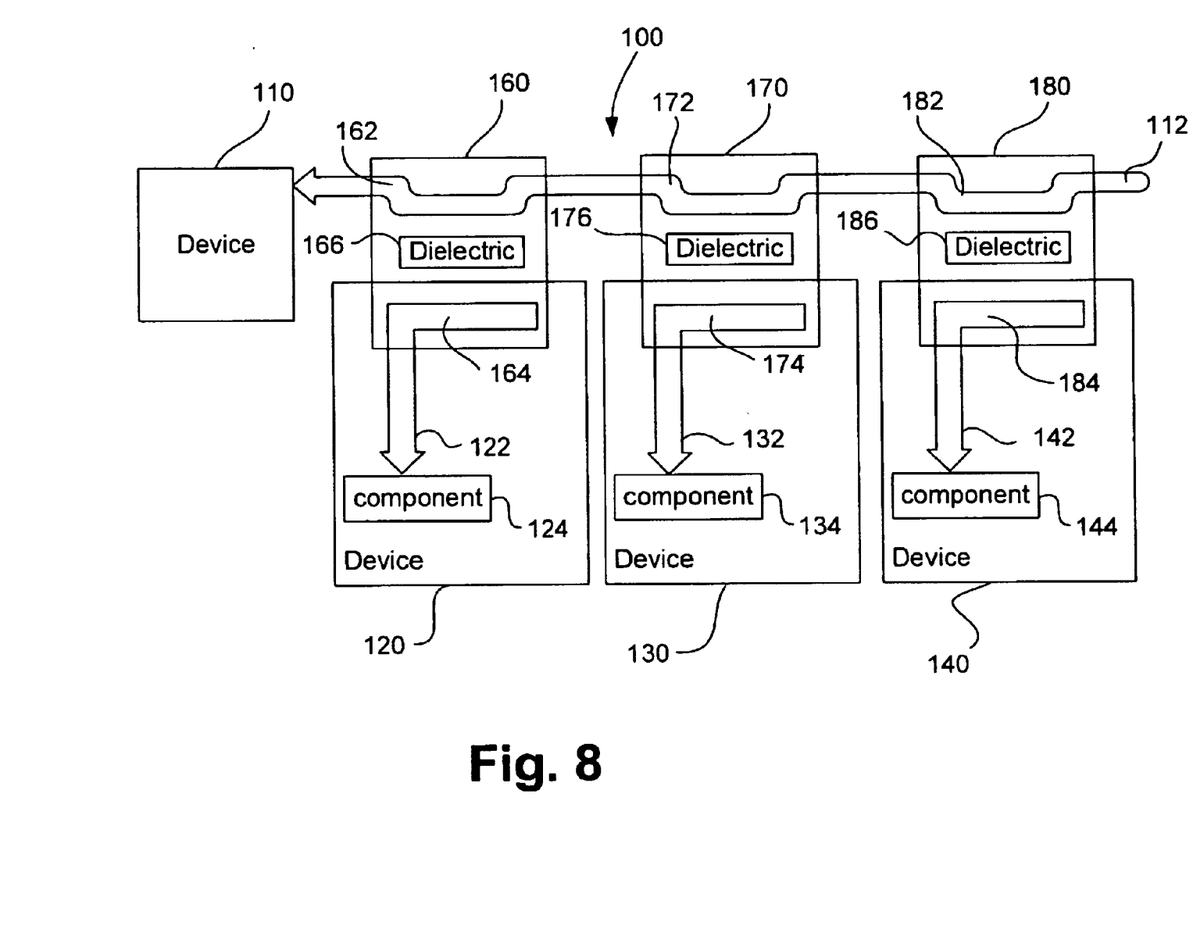
FIG. 8 is a block diagram of a multi-drop signal distribution system using electromagnetic couplers.
Figure 9:
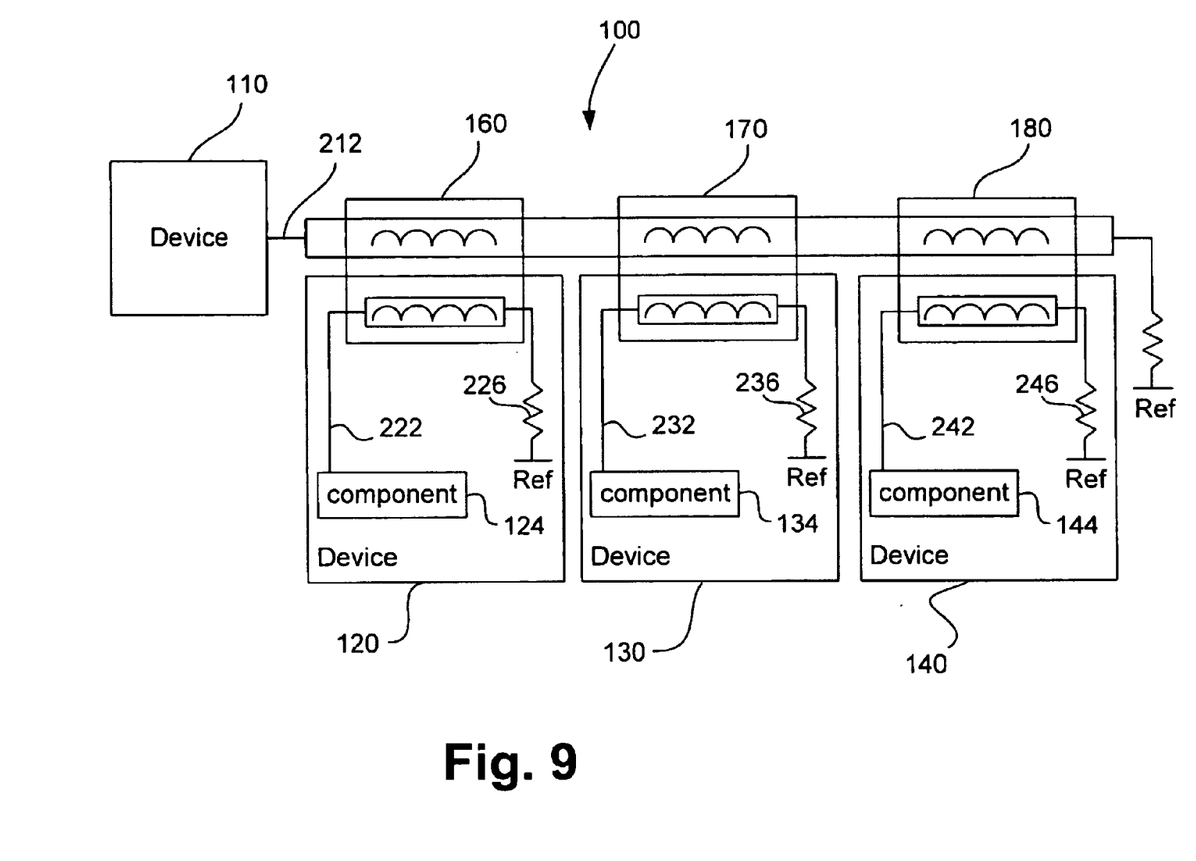
FIG. 9 is an electrical model of electromagnetic couplers.

Additional details of some implementations of a multi-drop signal distribution system 100 are shown in FIGS. 8 and 9 and discussed later.

At each of the coupling interfaces 12, 23, 25, the bus may include an electromagnetic coupler for each of the signal lines at that coupling interface. Example couplers 24, 26, 28 are shown in FIG. 1 at locations that are not occupied by sockets. Each of the electromagnetic couplers may interact across the interface with a corresponding electromagnetic coupler on the bottom of the sockets to permit signals to be communicated between the digital device held in that socket and the bus. A variety of configurations are possible for the couplers, including linear and zig-zag. Additional information about possible configurations of the couplers is set forth below and in U.S. patent application Ser. Nos. 09/792,502, 09/714,899, and 09/792,546, filed on Nov. 15, 2000.

Figure 3:
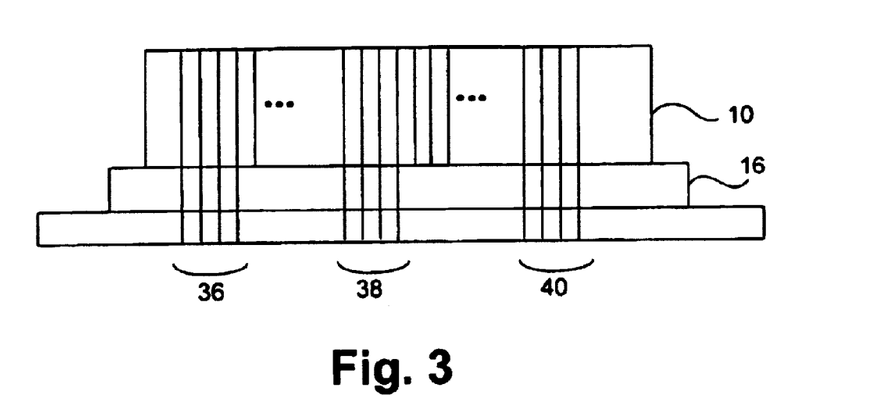
FIG. 3 is a sectional side view of a socket mounted on a motherboard.

As shown in FIG. 3 each of the sockets may be mounted on the motherboard by inserting, for example, three sets of pins 36, 38, 40 into corresponding through-holes in the motherboard and soldering the pins to the respective conductive layers, which may include ground and power layers. Thus, some of the pins in the three sets may carry ground and power to the digital devices while other pins may only provide mechanical support.

Each of the digital devices may hold one or more integrated circuits and other circuit components 41 and may carry conductors that correspond to lines of the bus and terminate at contact pads 43 along an edge of the board.

Socket 16 may be similar to a typical digital device or I/O card socket and may include metal traces 50, 52. The upper end 54 of each of the metal traces may be bent to form a spring that presses against a corresponding contact pad 43 when the card is inserted into the socket. At the other ends, some of the metal traces may pass through the body of the socket and form the ground and power pins of pin sets 36, 38, 40.

Others of the metal traces, which carry signals to and from the card, may have ends 61, 63 that are soldered to a rigid coupler 70 that is seated within a cavity 72 in the bottom of the socket 16.

Figure 4:
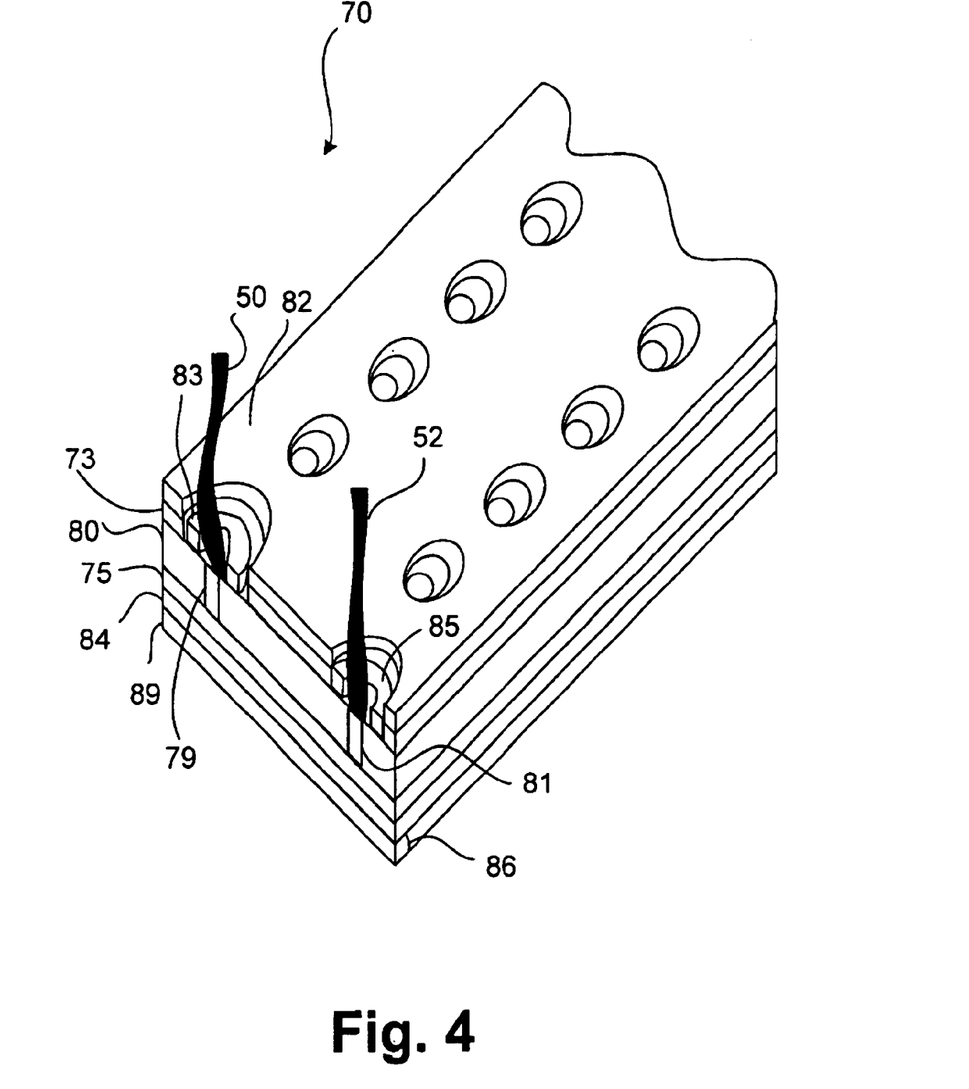
FIG. 4 is a three-dimensional view of the top of a fragment of a coupler.
Figure 5:
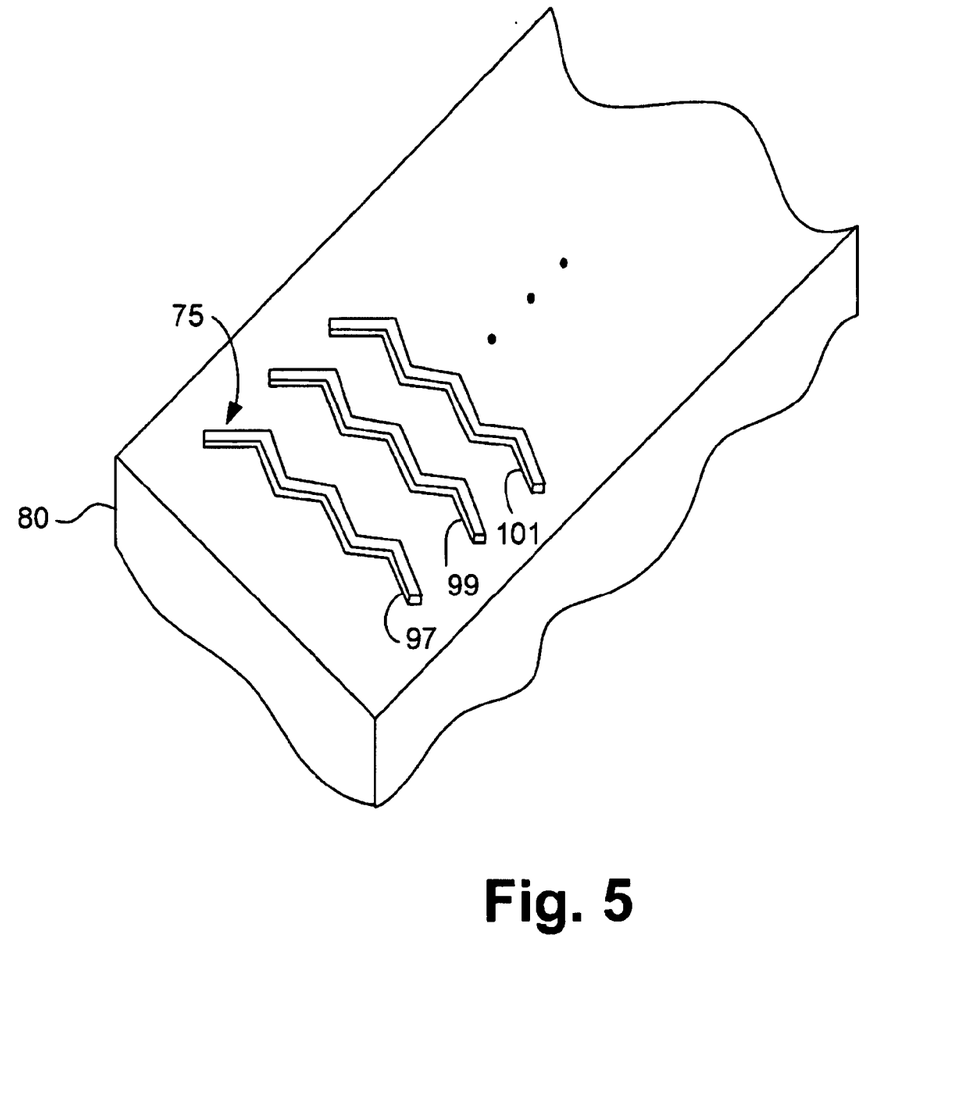
FIG. 5 is a three-dimensional view of the bottom of a fragment of a coupler.
Figure 6:
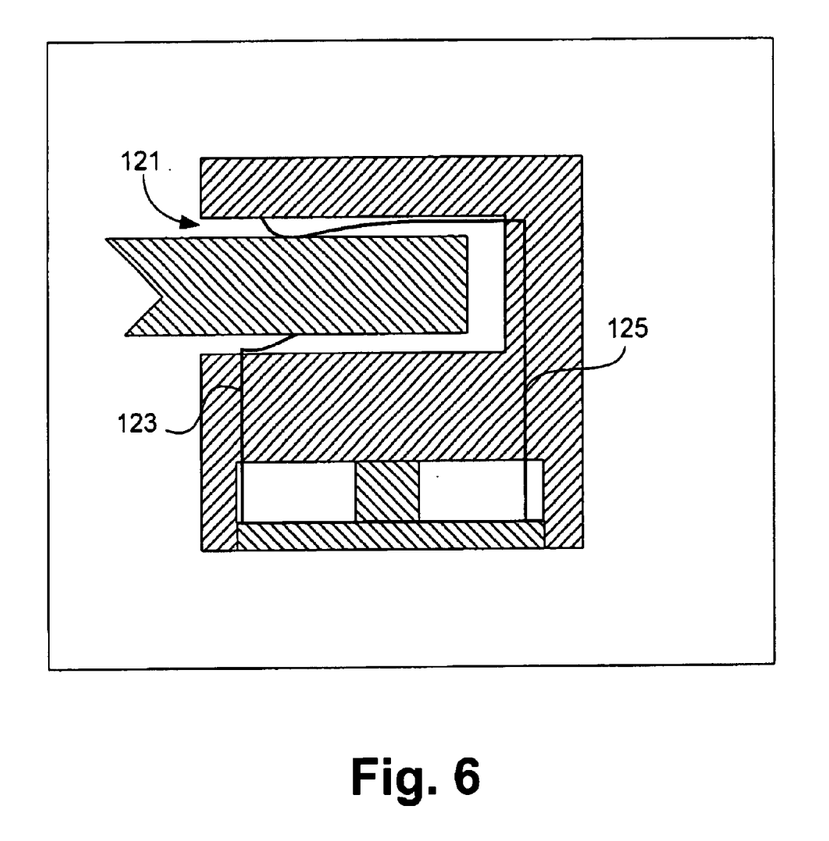
FIG. 6 is a sectional end view of another socket.

As shown in FIG. 4 (seen from the top) and FIG. 5 (seen from the bottom), some implementations of the rigid coupler may include a core 80 formed of a rigid epoxy laminated glass cloth sheet, such as grade FR4. (FIGS. 5 and 6 show only a portion of the full width of the rigid coupler. FIG. 6 does not show the detail of the layers of the coupler.) The upper and lower faces of the rigid coupler may bear metalization layers 73, 75. The lower metalization layer 75 may bear the electromagnetic coupler traces 97, 99, 101 of the electromagnetic coupler (as seen in FIG. 5). The lower metalization layer may be mechanically coupled to, but electrically isolated from, the upper metalization layer by through vias 79, 81 that form conductive electrical links to solder pads 83, 85 that are formed in the upper metalization layer (but not in contact with the rest of the upper metalization layer).

The upper metalization layer 73 of the rigid coupler may provide a reference plane for impedance control of the electromagnetic coupling traces on the bottom of the rigid coupler. On the upper metalization layer, a solder mask 82 may have apertures that define areas at which solder connections are made between the termination ends 50, 52 of the metal traces and the solder pads 83, 85. (The solder joints are not shown in FIG. 4, for clarity.) The bottom metalization layer also may bear a solder mask 84. The solder mask layer may act as a dielectric in the electromagnetic coupler.

The dielectric material characteristics may be important for coupler performance. The solder mask layer may also prevent a direct electrical connection with the traces on the motherboard.

As shown in FIG. 2, a position spacer 88 may be placed in cavity 72 with its upper surface in contact with the floor 73 of the socket and its lower surface in contact with the solder mask of the rigid spacer. The spacer may have a carefully controlled thickness 74 so that when the rigid coupler is mounted on the socket and the socket is mounted on the motherboard, the coupler traces 97, 99, 101 are parallel to and a predetermined distance 90 from the electromagnetic coupler traces on the upper surface 92 of the motherboard. The spacer 88 may be designed to prevent arbitrary "floating" of the vertical position of the rigid coupler while the rigid coupler is being soldered to the socket body.

To achieve the desired electromagnetic coupling at the interfaces 12, 23, 25, any potential air gap between the respective coupler traces should be eliminated. Warping of the motherboard and shrinking of the socket body during the molding process may cause air gaps between the respective coupler traces. By applying a thickness 86 of a viscous material 89 to the bottom of the rigid coupler or to the top of the motherboard or both before the socket is mounted, the force applied to the socket when it is mounted may cause the viscous material to be squeezed and to flow to fill the air gaps. The viscous material is selected to be one that (a) has a dielectric constant similar to the dielectric constant of the substrates of the mother board and the rigid coupler, (b) has a viscosity that will achieve the filling of air gaps, its bonding strength being secondary, (c) has good temperature stability and an ability to withstand the heat associated with soldering the pins to the motherboard, and (d) is separable from the motherboard, perhaps by heating, to permit reworking of the mounting.

To make the socket, the socket body 100 may be formed in a conventional way with the metal traces embedded in the body. High temperature solder balls may be placed on the upper surface of the rigid coupler. The position spacer may be placed in the cavity. The rigid coupler may be placed in the cavity touching the spacer and a clamping force may be applied to hold the rigid coupler in place against the bottom face of the spacer. Heat may be applied to reflow the solder. After the socket is formed, it may be attached to the motherboard by applying the thickness of viscous material, placing it on the board with the pin sets in through-holes of the motherboard, and soldering the pins to the motherboard.

In use, the digital device may be repeatedly inserted in and removed from the socket. Once inserted the signals can pass across the electrometrically coupled interface.

As shown in FIGS. 8 and 9, some implementations of a multi-drop bus system may include a device 110 and other devices 120, 130, and 140. Device 110 may have a bus 112 coupled to device 110. Devices 120, 130, and 140 may each comprise a bus 122, 132, and 142, respectively, and a component 124, 134, and 144, respectively. Buses 122, 132, and 142 may be coupled to components 124, 134, and 144, respectively.

Devices 120, 130, and 140 are each electromagnetically coupled to bus 112 by an electromagnetic coupler 160, 170, and 180, respectively. Electromagnetic couplers 160, 170, and 180 electromagnetically couple buses 122, 132, and 142, respectively, to bus 112, allowing components 124, 134, and 144, respectively, to communicate with device 110.

Electromagnetically coupling each device 120, 130, and 140 to bus 112 forms a data channel having substantially uniform electrical properties for transferring signals among devices 110, 120, 130, and 140 and allows use of relatively high frequency signaling without significantly increasing noise attributable to transmission line effects.

Although illustrated with three devices 120, 130, and 140 electromagnetically coupled to bus 112, bus 112 may have any suitable length and may accommodate any suitable number of devices to be electromagnetically coupled to bus 112. For one embodiment, bus 112 is approximately 50 centimeters (cm) in length, allowing up to 16 devices each to be electromagnetically coupled along approximately 1 cm of the length of bus 112 with each device spaced on a pitch of approximately 1.5 cm.

Each device 120, 130, and 140 maybe fixedly coupled to bus 112 or, alternatively, may be removably coupled to bus 112. As devices 120, 130, and 140 are electromagnetically coupled to bus 112, each device 120, 130, and 140 may be added to or removed from bus 112 with minimized effect on the communication bandwidth of bus 112.

Buses 112, 122, 132, and 142 may each comprise any suitable number of lines of any suitable conductive material. Devices 110, 120, 130, and 140 may each comprise any suitable circuitry to perform any suitable function. As one example, device 110 may comprise a memory controller and devices 120, 130, and 140 may each comprise a memory module, for example. Devices 110, 120, 130, and 140 may communicate over buses 112, 122, 132, and 142 using any suitable signaling scheme. Each device 110, 120, 130, and 140 for one embodiment communicates using differential signal pairs to help minimize power and electromagnetic interference (EMI) and to help increase noise immunity.

Each component 122, 132, and 142 may comprise any suitable circuitry. Each component 122, 132, and 142 for one embodiment serves as an interface for each device 120, 130, and 140 to communicate with device 110.

Although illustrated in multi-drop signal distribution system 100, each device 120, 130, and 140 for another embodiment may communicate with device 110 in a point-to-point manner by electromagnetically coupling each device 120, 130, and 140 to a respective bus coupled to device 110.

For one embodiment, as illustrated in FIG. 8, electromagnetic coupler 160 is formed by a portion 162 of the length of bus 112, a portion 164 of the length of bus 122, and a dielectric 166 between portions 162 and 164. Electromagnetic coupler 170 is formed by a portion 172 of the length of bus 112, a portion 174 of the length of bus 132, and a dielectric 176 between portions 172 and 174. Electromagnetic coupler 180 is formed by a portion 182 of the length of bus 112, a portion 184 of the length of bus 142, and a dielectric 186 between portions 182 and 184. Each dielectric 166, 176, and 186 may comprise any suitable dielectric material such as, without limitation, air, various polyimides, various epoxies, various polymeric materials, various plastics, various ceramics, polyethylene terephthalate (PET), polytetrafluoroethylene (PTFE) such as Teflon® by E. I. du Pont de Nemours and Company of Wilmington, Del., RT/Duroid® by World Properties, Inc. of Lincolnwood, Ill., and/or alumina, for example. Each electromagnetic coupler 160, 170, and 180 may be formed to have any suitable coupling coefficient, such as in the range of approximately 0.15 to approximately 0.45 for example.

FIG. 9 illustrates, for one embodiment, an electrical model 100 for electromagnetic coupler 160 coupling a single conductive line 212 of bus 112 and a single conductive line 222 of bus 122, for electromagnetic coupler 170 coupling line 212 of bus 112 and a single conductive line 232 of bus 132, and for electromagnetic coupler 180 coupling line 212 of bus 112 and a single conductive line 242 of bus 142.

Line 212 is terminated with a parallel resistor 216 coupled between the end of line 212 distant from device 110 and a suitable voltage reference, such as ground for example. Resistor 216 for one embodiment has a resistance approximately equal to the characteristic impedance of line 212. Line 222 is terminated with a parallel resistor 226 coupled between the end of line 222 distant from device 120 and a voltage reference. Resistor 226 has a resistance approximately equal to the characteristic impedance of line 222. Line 232 is terminated with a parallel resistor 236 coupled between the end of line 232 distant from device 130 and a voltage reference. Resistor 236 has a resistance approximately equal to the characteristic impedance of line 232. Line 242 is terminated with a parallel resistor 246 coupled between the end of line 242 distant from device 140 and a voltage reference. Resistor 246 has a resistance approximately equal to the characteristic impedance of line 242. Lines 212, 222, 232, and 242 are each terminated with a matched impedance for transmitting relatively high frequency signals.

As device 110 transmits a signal on line 212, a corresponding signal is induced on lines 222, 232, and 242 through electromagnetic coupler 160, 170, and 180, respectively, due to the electromagnetic fields generated by driving the signal on line 212. Similarly, as component 124, 134, or 144 transmits a signal, on line 222, 232, or 242, respectively, a corresponding signal is induced on line 212.

Lines 222, 232, and 242 each absorb only a fraction of the power of a corresponding signal driven on line 212. Each line 222, 232, and 242 terminates the received power using resistor 226, 236, and 246, respectively. Similarly, line 212 absorbs only a fraction of the power of a corresponding signal driven on line 222, 232, and 242. Line 212 terminates the received power using resistor 216. Each electromagnetic coupler 160, 170, and 180 may absorb any suitable amount of power depending, for example, on the amount of driven power and the coupling coefficient of the electromagnetic coupler. Each electromagnetic coupler 160, 170, and 180 for one embodiment absorbs less than approximately one percent of the power of a signal driven on any line coupled to the electromagnetic coupler. Because any capacitive load of devices 120, 130, and 140 and their respective lines 222, 232, and 242 are isolated from one another and from line 212, a generally constant impedance environment may be maintained on line 212 and any disturbance or impact of communication system parasitics on lines 212, 222, 232, and 242 is minimized or avoided.

Bus 112 for one embodiment is mounted on or integrated in a circuit board, and device 110 is mounted on or otherwise coupled to the circuit board such that device 110 is electrically coupled to bus 112. Each electromagnetic coupler 160, 170, and 180 is formed by positioning bus portions 164, 174, and 184, respectively, relative to bus portions 162, 172, and 182 with dielectric 166, 176, and 186 between the electromagnetically coupled portions.

Among the advantages of the invention are one or more of the following. The socket need not take up any more space (or require any more spacing from socket to socket) on the motherboard than a conventional non-electromagnetically coupled socket mounted on a conventional motherboard. The space on the motherboard need not be reallocated to accommodate the socket. Existing memory component packaging configurations can be used. The socket is rigid and therefore provides reliable and stable mechanical performance. The socket can be made and installed simply and at low cost.

Although the above description mentions some implementations, other implementations are also within the scope of the following claims.

For example, a reference plane may not be required on the rigid coupler if the metal trace is made short enough and with a low-enough profile spring contact The length of the spring may be optimized by simulation so that its effect on rise time of a high speed signal will be minimized. The exact length of the spring may be determined by system requirements on output rise time and by the available IC technology on input rise time. Through such optimization, the uncontrolled impedance of the metal spring will have limited overall effect on electrical performance. Otherwise, measures such as a reference plane molded inside the socket frame may have to been taken for full impedance control.

In addition, the spring shape may be changed to reduce friction force during digital device insertion since the friction force (vertical force) is exerted onto interconnects between the spring and the rigid coupler, which may increase the likelihood of solder ball damage.

In laptop computers and some servers, digital devices are often mounted parallel to the motherboard to minimize the projection of the cards above the motherboard. As shown in FIG. 6, in some implementations, a low-profile version of the socket can be constructed with an insertion slot 121 that is oriented horizontally rather than vertically. The bottom portion of the socket and the rigid coupler are similar to the ones described earlier, but the metal traces 123, 125 on the two sides of the connector may have different contours as shown.

Figure 7:
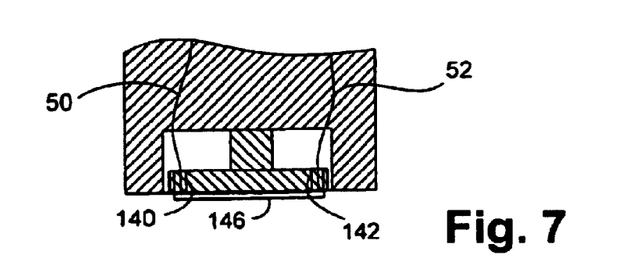
FIG. 7 is a sectional end view of a portion of another socket.

As shown in FIG. 7, in alternative implementations for the rigid coupler, instead of soldering the terminations of the metal traces to the upper surface of the coupler and making electrical connections by vias to the coupler traces on the bottom of the rigid coupler, the metal traces may be soldered into plated-through holes 140, 142 in the core and in that way make direct contact to the coupler traces 146. Such an arrangement may avoid possible reliability concerns about the soldered joints between the metal trace terminations and the top of the rigid connector described earlier.

Although the implementations described above refer to memory cards, and motherboards of computers, the socket arrangement may be used in any environment in which an insertable device is to be electromagnetically coupled to a bus for communication of signals.

What is claimed is:

1. Apparatus comprising
    a connector configured for insertion and removal of a digital device, the connector having contacts arranged to make electrical connection to conductors on the digital device while the digital device is inserted in the connector, and
    a first electromagnetic coupler connected to at least one of the contacts of the connector, the electromagnetic coupler being configured for electromagnetic coupling at an interface to a second electromagnetic coupler that is connected to a communication bus,
    the connector comprising a rigid coupling element, and the first electromagnetic coupler being on a surface of the rigid coupling element.

2. The apparatus of claim 1 in which the connector comprises a socket.

3. The apparatus of claim 2 in which the socket is configured to receive a memory card.

4. The apparatus of claim 1 in which the contacts comprise spring contacts.

5. The apparatus of claim 1 in which the contacts are configured to carry signals.

6. The apparatus of claim 1 in which the digital device comprises a memory card.

7. The apparatus of claim 1 in which the digital device comprises an I/O card.

8. The apparatus of claim 1 in which the connector comprises a socket body having a slot configured to receive the digital device and a cavity to receive the rigid coupling element.

9. The apparatus of claim 8 in which the connector comprises a spacer that defines a fixed distance between a wall of the cavity and the rigid coupling element.

10. The apparatus of claim 1 also including a viscous liquid on the first electromagnetic coupler.

11. The apparatus of claim 1 in which the contacts of the connector are soldered to pads on a surface of the rigid coupling element, and the pads are electrically connected to the first electromagnetic coupler by vias in the rigid coupling element.

12. The apparatus of claim 1 in which the contacts of the connector are soldered to through holes in the rigid coupling element.

13. The apparatus of claim 1 in which the rigid coupling element comprises a core and metalization layers on two faces of the core.

14. The apparatus of claim 13 which the rigid coupling element also includes solder masks on the metalization layers.

15. A system comprising
a circuit board,
a bus arranged on the circuit board,
electromagnetic couplers defined at locations along the bus,
sockets having rigid electromagnetic couplers and contacts for connection to contact pads of device boards, the sockets being mounted to define interfaces across which electromagnetic coupling of signals can occur between the electromagnetic couplers defined along the bus and the electromagnetic couplers on the sockets.

16. The system of claim 15 in which the sockets are mounted on the board by pins.

17. The system of claim 15 in which each of the sockets has an electromagnetic coupler for each of a set of signals carried by the contacts of the sockets.

18. The system of claim 15 in which each of at least some of the electromagnetic couplers have a zig-zag configuration.

19. The system of claim 15 also including a processor mounted on the board and coupled to the bus.

20. A system comprising
a circuit board,
a bus arranged on the circuit board,
electromagnetic couplers defined at locations along the bus,
sockets having rigid electromagnetic couplers and contacts for connection to contact pads of device boards, the sockets being mounted to define interfaces across which electromagnetic coupling of signals can occur between the electromagnetic couplers defined along the bus and the electromagnetic couplers on the sockets, and
device boards mounted in the sockets.

21. The system of claim 20 in which the device boards include memory devices or I/O devices.

22. A method comprising
conducting digital signals along a bus,
at locations along the bus, coupling the digital signals to sockets through rigid electromagnetic couplers,
within the sockets conducting the digital signals to contacts, and
conducting the signals from the contacts to boards plugged into the sockets.

23. The method of claim 22 in which the signals comprise memory address and data signals.

24. A method comprising
mounting sockets on a circuit board at locations of electromagnetic bus couplers using a force that causes viscous material to be squeezed and to flow to fill air gaps between the sockets and the circuit board, and
populating the circuit board with components that include a processor coupled to a bus served by the electromagnetic bus couplers.

25. The method of claim 24 also including inserting digital devices into the sockets.

26. Apparatus comprising
a connector configured for insertion and removal of a digital device, the connector having contacts arranged to make electrical connection to conductors on the digital device while the digital device is inserted in the connector,
a first electromagnetic coupler connected to at least one of the contacts of the connector, the electromagnetic coupler being configured for electromagnetic coupling at an interface to a second electromagnetic coupler that is connected to a communication bus, and
a viscous liquid on the first electromagnetic coupler.

27. The apparatus of claim 26 in which the communication bus is on a dielectric substrate, and a dielectric constant of the viscous liquid is similar to a dielectric constant of the substrate.

28. The apparatus of claim 26 also including a substrate bearing the second electromagnetic coupler.

29. The apparatus of claim 28 in which the substrate comprises a motherboard.

30. The apparatus of claim 28 in which the viscous liquid fills a gap between the first electromagnetic coupler and the second electromagnetic coupler.

* * * * *